(12) United States Patent
Wimmer

(10) Patent No.: US 7,392,693 B2
(45) Date of Patent: Jul. 1, 2008

(54) TEST STAND FOR MOTOR VEHICLES

(75) Inventor: Hermann Wimmer, Pleiskirchen (DE)

(73) Assignee: Femboeck Automotive GmbH, Neuoetting (DE)

( * ) Notice: Subject to any disclaimer, the term of this patent is extended or adjusted under 35 U.S.C. 154(b) by 0 days.

(21) Appl. No.: 10/531,836

(22) PCT Filed: Oct. 16, 2003

(86) PCT No.: PCT/DE03/03465

§ 371 (c)(1),
(2), (4) Date: Oct. 26, 2005

(87) PCT Pub. No.: WO2004/038355

PCT Pub. Date: May 6, 2004

(65) Prior Publication Data

US 2006/0123896 A1   Jun. 15, 2006

(30) Foreign Application Priority Data

Oct. 18, 2002   (DE) ............................... 102 48 871
Jun. 6, 2003    (DE) ............................... 103 26 116

(51) Int. Cl.
*G01M 17/00*   (2006.01)
(52) U.S. Cl. .......................................... 73/123; 73/117
(58) Field of Classification Search ............... 73/112, 73/116, 117, 117.2, 117.3, 118.1, 121, 122, 73/123, 124, 125, 126
See application file for complete search history.

(56) References Cited

U.S. PATENT DOCUMENTS

| | | | |
|---|---|---|---|
| 1,957,455 A | 5/1934 | Graham | |
| 1,976,632 A | 10/1934 | Piquerez | |
| 6,345,237 B1 | 2/2002 | Müller | |
| 6,427,528 B1* | 8/2002 | Yamakado et al. | 73/121 |
| 6,739,185 B2* | 5/2004 | Schoeninger | 73/146 |
| 7,013,704 B2* | 3/2006 | Kusters et al. | 73/1.79 |
| 2003/0041666 A1* | 3/2003 | Parker | 73/462 |
| 2003/0209061 A1* | 11/2003 | Schoeninger | 73/118.1 |
| 2004/0000191 A1* | 1/2004 | Ben-David | 73/118.1 |
| 2006/0130567 A1* | 6/2006 | Ben-David | 73/118.1 |

FOREIGN PATENT DOCUMENTS

| | | |
|---|---|---|
| DE | 38 41 248 A1 | 6/1990 |
| DE | 195 05 533 A1 | 8/1996 |
| DE | 198 41 944 A1 | 3/2000 |
| GB | 1197623 A | 7/1970 |

* cited by examiner

Primary Examiner—Eric S McCall
(74) Attorney, Agent, or Firm—Alston & Bird LLP

(57) ABSTRACT

A test stand for motor vehicles with a roller assembly (1) having a contact surface (3) for rolling the wheels (2), with the contact surface (3) being rotatably driven and adapted to be blocked, and/or braked, and/or released. The roller assembly (1) is mounted for at least a slight movement with at least two degrees of freedom, and to determine the force which is generated by the motor vehicle during driving and/or braking movements of the vehicle, it is possible to measure the force that is operative between the roller assembly (1) and a predeterminable fixed point (10), and/or the displacement occurring during driving and braking movements of the motor vehicle, and/or the angle of rotation between the roller assembly (1) and a predeterminable fixed point (10).

17 Claims, 5 Drawing Sheets

TEST STAND FOR MOTOR VEHICLES

BACKGROUND OF THE INVENTION

The present invention relates to a test stand for motor vehicles with a roller assembly comprising a contact surface for rolling the wheels, with the contact surface being rotatably driven and adapted to be blocked, and/or braked, and/or released.

Test stands of the generic type have been known from practical operation for a long time. They are used in motor vehicle repair shops and also by the TÜV [German Technical Inspection Association] within the scope of the periodic performance test of motor vehicles. Normally, the operability or effectiveness of the brakes is checked.

In the art known from practical operation, there basically exist three different methods of testing automotive brakes. Until now, it has been common practice to test with very special equipment, such as test plates, test rollers, or by means of a decelerometer. Testing with test plates and by means of a decelerometer is known as a dynamic test. The use of test rollers relates to a static test. The difference between the dynamic test and the static test consists in that the test with test plates or by means of a decelerometer makes it necessary to move the vehicle. The test plates and the decelerometer are stationarily arranged. However, in the case of the test by means of test rollers, the vehicle wheel and the test rollers rotate. The foregoing description explains the main difference between the two basic testing methods.

In a plate brake tester, the test plate is used to simulate a portion of the road, with the plate being supported on rollers. The vehicle drives over the test plate, which connects in the travel direction via a measuring element to the surroundings, for example, a drive-on ramp. When the vehicle is braked on the test plate, the braking forces developing during the braking are picked up via the measuring element. The measuring procedure will last only as long as the vehicle remains on the test plate which has a limited surface. In practice, the measuring time ranges from 0.5 to 1 second.

The faster the vehicle is driven onto the test plate, the greater are the recorded braking forces. A braking force that is to be recorded at most can, however, not be higher than the friction between the tires and the test plate. Otherwise, the slip limit will be exceeded. In the case of the plate brake tester, it is, however, disadvantageous that the measuring result is dependent on the drive-on speed. Moreover, the measuring can be performed only over a very short duration, since the length of the brake plate is limited. Last but not least, the plate brake tester is not very practical, since it is extremely difficult for a layperson to start the braking maneuver exactly at the point, i.e., exactly upon driving onto the test plate.

Because of its constructional design, the roller brake tester is nothing more than an endlessly long road, which is simulated by rotating rollers. This makes it possible to test the braking operation over any length of time.

The mode of operation of the roller brake tester results from its constructional design. Over a tester frame, the vehicle drives slowly onto the roller assembly, normally two rollers, until it comes to a stop on the test rollers. The test rollers are driven by an electric motor, in most cases via chains. The electric motor is usually supported for oscillation. When the wheel is braked, the electric motor will have to apply more force to rotate the wheel. This force is measured via a sensor, which is usually constructed as a torque support.

The roller brake tester known from practice is a static system, in which the vehicle is stationary. The rollers can be rotated for any length of time, so as to permit testing the brake system of the vehicle in almost any state. Contrary to the plate brake tester, the test is by no means limited in time, and any driving condition, depending on the drive of the test rollers, can be repeated as many times as desired. However, similarly to the plate brake tester, it is not possible to test the brake beyond the coefficient of adhesion of the roller surface, since the slip limit is then exceeded.

Further, a conventional roller brake tester has the disadvantage that the tires directly rotate on two rollers and are impressed or flexed by the rollers. This falsifies the test result because of different static frictions of the particular situations, i.e., as a function of weight, so that the roller brake tester appears to be disadvantageous in this respect.

It is further known from practice to test the braking action of a vehicle by means of decelerometers. A decelerometer ultimately operates with an accelerated mass or weight, which is mounted on rollers and connected via a spring to a frame. During the measurement, the decelerometer lies horizontally in the direction of the movement. During the braking operation, the weight, in this instance the motor vehicle, is deflected in the travel direction. The displacement is measured and converted into deceleration. To this end, it is also possible to use an acceleration sensor, which operates by the same principle. As the braking deceleration sets in, the same forces are active as the own weight of the test body itself.

In practice, the decelerometer is problematic, since it permits determining only the total deceleration of the vehicle, but not the distribution of the braking force over the individual wheels. Consequently, this type of testing is applied only in exceptional cases, i.e., generally only when a vehicle cannot be tested by the two foregoing methods because of technical conditions.

Last but not least, it is common to perform in the test stands of the art, the functional tests of vehicle components with respectively one tester that is suitable for the particular test. In this connection, it is preferred to use rotating drives or brakes for determining the braking force and performance. To determine track values, one uses either track testing plates or wheel alignment analyzers. Shock absorbers are tested with shock absorber testing devices, and joint play is tested via pneumatically or hydraulically operated test plates. Testing of the individual parameters is sequential, in that the vehicle moves from testing device to testing device, or depending on need, that the testing device moves to the vehicle. Only in few exceptions is a combination device offered, which connects, however, via test rollers to the wheel. This is not road-conforming and considerably falsifies the actual wheel contact forces as they occur on the road.

A test stand is disclosed, for example, in U.S. Pat. No. 1,957,455, wherein the wheel is supported on a driving belt which assumes an arcurate path. While this increases the wheel contact surface, it does not correspond to the condition on the road.

It is therefore an object of the present invention to provide a test stand of the initially described type, which permits realizing a particularly indicative performance test with constructionally simple means.

SUMMARY OF THE INVENTION

In accordance with the invention, the foregoing object is achieved by the provision of a test stand which has a mounting frame which mounts a roller assembly. The roller assembly is supported for at least a slight movement with at least two degrees of freedom, and that to determine the force that is generated by the vehicle during its driving and braking movements, it is possible to measure the force that is active between the roller assembly and a predeterminable fixed point, and/or the displacement that occurs as a result of the driving and braking movements of the vehicle, and/or the angle of rotation between the roller assembly and a predeterminable fixed point.

In accordance with the invention, it has been found that it is quite possible to realize a single test stand which permits detecting a plurality of different parameters within the scope of quasi a single measuring operation. To this end, the roller assembly is mounted for at least a slight movement with at least two degrees of freedom. It is thus possible to detect and document, for example, not only forces that occur in the travel direction, for example, in brake tests, but also, for example, lateral forces, that occur in the direction transverse thereof. More specifically, to determine the force that is generated by the vehicle during its driving and/or braking movements, it is possible to measure the force that is active between the roller assembly and a predeterminable fixed point. As an alternative or in addition thereto, it is furthermore possible to measure the displacement that occurs during the driving and/or braking movements of the vehicle, and/or the angle or rotation between the roller assembly and a predeterminable fixed point. In other words, it is possible to measure forces, which are operative in different directions, and/or displacements and/or angles of rotation between the roller assembly and a predeterminable fixed point.

Last but not least, it is thus possible to detect in a three dimensional profile, at the same time or with a time lag, all forces that are generated by the vehicle. This procedure may occur while arranging the vehicle on a single test stand. In this connection, there is also an allowance made for the fact that each vehicle has a differently configured construction of chassis, brake, drive, and tires. Since the wheel represents via the tire the last point on the vehicle toward the road, the sum of all forces that develop during the rolling, develops in this point. This compares with the actual situation on the road. In this connection, the road is reset or simulated by the endlessly revolving contact surface.

The test stand of the invention is a test stand with a rotationally driven contact surface and, thus, a test stand that operates statically, i.e., in which the vehicle is stationary and the contact surface of the roller assembly represents a quasi endless road. In itself, the roller assembly represents a compact unit, which is supported for at least a slight movement with at least two degrees of freedom. To determine the force that is generated by the vehicle during its driving and/or braking movements, it is possible to use any type of force pickup. Accordingly, the roller assembly operates in a manner similar to the roller brake tester, on which the wheels of the vehicle are positioned. It eliminates the disadvantages of the conventional roller brake tester insofar as the operation in the case of the plate brake tester is realized in that the roller assembly is constructed as a specially supported unit, i.e., in a manner similar to the test plate of the plate brake tester. It is thus possible to dislocate the roller assembly as a whole with at least two degrees of freedom. Between the roller assembly and the predeterminable fixed point, a measuring device is operative for purposes of determining the force and/or determining the occurring displacement and/or angle of rotation.

Consequently, the test stand of the invention realizes a test stand for vehicles, which realizes a particularly indicative and versatile performance test with constructionally simple means.

In a concrete configuration of the test stand, one degree of freedom could correspond to a movement transverse or perpendicular of the travel direction in a horizontal direction, in particular along an X-axis. With that, it is possible to determine a lateral force. In this direction, the inclined position of the wheel relative to the travel direction, the track, is delineated. Depending on the adjustment, in the case of toe-in or toe-out, a positive or negative force is exerted relative to the travel direction. In this process, the contact surface and/or the roller assembly is correspondingly displaced in the X-direction. A track alignment could now occur in that a displacement and/or the force is measured, until the contact surface and/or the roller assembly has moved so far that the measured force equals 0. As an alternative, the contact surface and/or roller assembly could be dislocated for the track alignment, until no force acts any longer upon the contact surface and/or the roller assembly. In other words, the force will be equal to 0. By measuring the displacement in this direction, it will be possible to determine a sideslip of the vehicle.

A further degree of freedom could correspond to the movement along the travel direction, in particular along the Y-axis. In this direction, it is possible to measure the force in or against the travel direction. The force in the travel direction corresponds to a braking force, the force against the travel direction corresponds to an acceleration.

A further degree of freedom could correspond to a movement transverse or perpendicular of the travel direction in a vertical direction, in particular along a Z-axis. In this case, it would be possible to measure the weight of the wheel or the vehicle, and to realize a shock absorber test.

A further advantageous degree of freedom could correspond to a rotation about a preferably vertical axis, in particular a Z-axis. A measurement of the twisting angle could give an indication of the track alignment of the vehicle.

In a particularly advantageous configuration, the entire test stand could be constructed for rotation about a preferably vertical axis, in particular a Z-axis. This would permit simulating, for example, a travel through curves. In so doing, it would be possible to adjust or control any angular position relative to the travel direction. A function of this type would permit realizing a joint play tester and/or a wheel bearing tester.

In a particularly practical and simple manner, the compactly realizable roller assembly could be mounted in a lifting platform. With respect to a highest possible mobility, it would also be possible to mount the roller assembly in a vehicle. This would permit moving the roller assembly to desired locations of use.

In a further advantageous configuration, the roller assembly could be mounted in a vibrating or oscillating device. This would permit simulating unevenness of a road, and performing a shock absorber test, if need be.

As an alternative or in addition to a rotatability of the entire test stand about a desired axis, it would be possible to arrange the roller assembly itself in a turning device, and it would thus be rotatable to perform joint play or wheel bearing tests, if need be.

Within the scope of a particularly advantageous arrangement, in particular with respect to any desired possibility of revamping workshops, TÜV testing devices, or the like, the roller assembly could be arranged in a frame that is installed on or in the floor, or adapted for mounting to a wall, so that the roller assembly can be operated together with the frame. A roller assembly of this type with a permanently associated frame could be positioned anywhere on the floor of a workshop and be adapted to be positioned and secured relative to a fixed point, to the floor or a wall, while interposing a suitable measuring device. Thus, it is possible to install the test stand of the invention having, for example, an overall height of 50 mm, in a variable manner. It is only necessary to make sure that it is able to support itself against the floor, against a wall, or the like. In the case of a small structural shape, it is also possible and easy to provide a corresponding recess in the floor and to integrate the frame into floor in part or in full.

Furthermore, it is also possible to install the entire test stand or the roller assembly with the frame inside a recess in the floor, for example, to mount it on a roller bearing, and to arrange for gathering the measured values, a corresponding measuring device between the frame and the wall of the recess in the floor. A complete integration into the floor is ensured with a best possible mounting support and displaceability of the entire frame.

When jointing the roller assembly or the test stand to a wall, same could occur by means of a coupling element, preferably by means of a metal component. The coupling element could be made in a particularly simple manner integral with the frame.

The coupling element and/or the frame could be provided in at least one predeterminable location with at least one weak point, so that flections and/or torsions are detectable preferably via at least one sensor that is associated to the coupling element.

In a constructionally particularly simple manner, the weak point or points could be formed by recesses or milled slots. In this connection, it would be possible to arrange at least one force transducer or sensor for flections and/or torsions in a particularly simple manner with respect to measurements in the weak point or points. As force transducers or sensors, one could use wire strain gauges. Force transducers or sensors of any type would be able to move under load through the recesses, milled slots, or receptacles, thus permitting the measurement of, for example, horizontal and vertical braking forces.

In the case of highly indicative measurements, a separate roller assembly could be provided for each wheel of an axle. In this case, each of the two roller assemblies could be associated to a separate frame. With that, one could provide for the two wheels of an axle two separate roller assemblies with corresponding frames. These two roller assemblies could be arranged together with their frames on the floor or in the floor. With that, a variable use exists. As an alternative arrangement, both roller assemblies could be associated to one frame. Such an arrangement presents itself in particular for stationary test stands. In the case of mobile test stands, the separate operability of two frames with roller assemblies arranged therein is more favorable.

Within the scope of a very particularly advantageous arrangement, in particular for avoiding deformation or flexing of the wheel during the actual test, the roller assembly could comprise at least two rollers or cylinders, with a moving belt in the form of an endless belt and forming the contact surface being able to run over the rollers or cylinders. With the aid of such a moving belt, it is possible to ideally imitate a road, so that the behavior of the vehicle can be tested on an endlessly constructed road. To simulate a more or less smooth road covering, it will be of further advantage, when the roller assembly comprises three or more rollers or cylinders, so that unevennesses are largely avoided.

As aforesaid, it is preferred to arrange the rollers or cylinders in a frame. In a furthermore advantageous manner, the rollers or cylinders are laterally supported in the frame and arranged such that they rotate within the frame with a clearance above the ground. It is likewise possible to support the entire arrangement of the roller assembly with its frame again on rollers or cylinders to ensure their safe displaceability relative to the measuring device, for example, within a recess in the floor. To this end, the rollers or cylinders could be mounted laterally in the frame in antifriction bearings. A realization in a slideway is likewise possible and especially simple with respect to construction.

To make available a particularly level contact surface, a sliding device, preferably a slide plate could be associated to the roller assembly. In this instance, a moving belt forming the contact surface would be able to slide on the sliding device. As an alternative to the sliding device, one could provide an arrangement of rollers or cylinders, on which a moving belt forming the contact surface would be able to run. An arrangement of rollers or cylinders presents itself in particular in the case of higher operating speeds, since there is a risk that excessive heat will develop, when a sliding device is used. The sliding device could also be formed by individual lamellas below the contact surface.

To absorb or take up laterally operative forces or side forces, the contact surface could include a lateral force absorbing means. Such a lateral force absorbing means could be formed preferably by a belt or a flexible rib, which is associated to the contact surface. As an alternative or in addition thereto, a roller or cylinder, and/or a sliding device, or a roller or cylinder arrangement could comprise a guide means for taking up lateral forces. Such a guide means could be formed by a groove in the last-mentioned components. With respect to a particularly reliable absorption of lateral forces, lateral force absorbing means of the contact surface and the lateral force absorbing means of the roller or cylinder, and/or the sliding device, or the roller or cylinder arrangement could be constructed complementary to one another. In other words, a belt or a flexible rib of the contact surface could extend in a corresponding groove of the roller, cylinder, sliding device, or arrangement of rollers or cylinders.

With respect to a constructionally very simple arrangement, the roller assembly could be guided in the sense of an XY-carriage or XYZ-carriage. Such a guidance could occur within a frame. The roller assembly could then form an independent operating module. In this sense, a drive module could be an independent operating module, and preferably be adapted for being placed on the roller assembly in different ways or for being coupled with the roller assembly.

From its basic principle, the roller test stand of the invention operates similarly to the conventional roller test stand. Consequently, it is necessary that the vehicle drive with each wheel that is to be tested onto the roller assembly, which is then driven. Although the vehicle remains stationary, the wheels are caused to rotate, thereby simulating an acceleration of the vehicle. For safety reasons, in particular to prevent the wheel from being pushed or shoved rearward from the roller assembly, when being braked, a freely rotatable support roller is arranged, within the scope of a very particularly advantageous arrangement, in front of the first roller or cylinder, when viewed in the running direction, i.e., behind the wheel being on the roller assembly. This support roller is able to prop the wheel while being braked, thereby ensuring a safe positioning of the wheel on the test stand.

As an alternative or in addition, one could arrange, when viewed in the running direction, behind the last roller or cylinder, i.e., in front of the wheel being located on the roller assembly, a freely rotatable support roller, against which the wheel is propped, while being accelerated. With that a safe positioning of the wheel on the test stand would be ensured during accelerations.

Specifically, the support roller could be held in its supporting position by means of lateral support arms elastically or by the tension of a spring. In this connection, the lateral support arms could hold the support roller in its supporting position such that it can be lowered by the tire in the travel direction, while overcoming the elastic force or spring tension, and be automatically raised to its supporting position after driving over it. The support roller or the support arms is or are locked in position against the travel direction and cannot be pushed down from their propping position. Since the support roller is mounted for rotation, it presents a suitable abutment for the rotating wheel while decelerating or accelerating the latter.

It is likewise possible to drive over the support roller in a lowered state. As soon as the wheel is positioned on the roller assembly, it would be possible to actuate the support roller, so that same moves upward to its propping position, and is preferably locked in this position. Quite generally, the support roller could be adapted for movement to its propping position, when the wheel is positioned on the roller assembly. The support roller and the support arms mounting the support roller could be provided with a very special mechanism, preferably a worm gearing, which is adapted for raising the support roller from its lowered position to its propping position. However, also other mechanical arrangements or drives are possible.

As previously stated, it is possible to measure, for example, while braking, the force that is operative between the roller assembly and a predeterminable fixed point. Provided the roller assembly is arranged within a frame, and provided the frame defines the roller assembly or the test stand as a whole, the pickup of the force and/or the measurement of the displacement and/or angle of rotation could occur between the rollers or cylinders and the frame, in particular with respect to a compact construction. To this end, it is necessary to arrange, when interposing a measuring device, the rollers or cylinders for at least a slight movement within the frame. At any rate, it is possible to pick up the force and/or measure the displacement and/or angle of rotation in desired points between the rollers or cylinders and the frame. In this instance, it is necessary to ensure a displaceability and/or rotatability of the rollers within the frame.

In a particularly compact arrangement, it would be possible to pick up the force and/or measure the displacement and/or angle of rotation in or on the bearings and/or inside the rollers or cylinders.

With respect to a reliable drive of the roller assembly, at least one roller or cylinder could be constructed as a frictionally engaged drive roll or drive cylinder. In other words, the roller or cylinder would be driven for rotation. The other roller or cylinder or rollers or cylinders could be made as a nonfrictionally engaged deflection roll or deflection cylinder, thereby realizing a rotational drive via the contact surface or the moving belt. The roller or cylinder could be mounted for free rotation.

To drive at least one of the rollers or cylinders, one could provide at least one motor, preferably an electric motor, which engages at least one or more rollers or cylinders by means of a chain, drive belt, or the like. As motor it is also possible to use gasoline- or gas-operated motors. Last but not least, motors of any desired type are possible. It would be possible to realize even a magnetic drive. Any motor could be adapted for disengagement to drive the belt or the contact surface, so as to permit idling.

The motor could be arranged in a particularly compact manner in the region between the rollers or cylinders. Depending on need, the motor could also be arranged in the region below the rollers or cylinders. It is even possible to arrange the motor in one of the driven rollers or cylinders or in the driven rollers or cylinders to realize a compact configuration of the test stand. In this instance, the motor could be an integral part of the roller or cylinder.

In particular within the scope of an especially flat configuration of the test stand, it would be possible to arrange the motor in one of the driven rollers or cylinders. In this respect, the roller or cylinder forming a component of the motor could be driven directly and without extensive losses as a direct drive without a gearing.

To prevent the contact surface from icing, a heating device for the contact surface could be associated to the roller assembly. With that, it is possible to use the test stand at low temperatures.

With respect to a reliable operation of the contact surface, the roller assembly could include a tensioning device for stretching the contact surface. Such a tensioning device could include at least one spring that is operative between two rollers or cylinders. In this connection, it would be possible to provide one roller or cylinder or a plurality of rollers or cylinders, which are displaceable for tensioning, so that the contact surface or the belt can be stretched over the rollers or cylinders. A tensioning device could operate automatically, so that the contact surface or the belt is always pretensioned in a suitable manner.

The contact surface of the moving belt could be adapted for removal at least from one side of the roller assembly. This permits replacement, when the belt is worn, and/or when differently designed contact surfaces or belts are used for different conditions of use. In particular, the top of the contact surface could include a granular structure of a predetermined grain size, which permits simulating different roadway surfaces. In particular, it would be possible to use as contact surface a kind of emery belt, which is known from belt sanders.

In a further arrangement, the top of the contact surface could comprise a rubber covering of predeterminable thickness. In this instance, it would be possible to test, for example, wheels that mount tires with spikes. The rubber covering could prevent a rapid destruction of the contact surface.

With respect to a commercial use, the top of the contact surface could include preferably imprinted picture and/or text information, which could be used to realize advertising.

With respect to a particularly stable contact surface, the latter could be made as a moving belt, preferably as fabric belt, thereby ensuring a long-lasting operation of the test stand.

In a further advantageous arrangement, it would be possible to associate to the roller assembly a receiver for sound waves, preferably a microphone. With that, it would be possible to detect rolling noises in order to perform a tire test with respect to smooth running. For example, it is thus possible to detect whether or not tire profiles have scaled off, which makes it possible to test the track or track alignment. The rolling noise can also be used to determine unbalances. Such unbalances can also be found via detectable weight fluctuations.

It would be possible to associate to the contact surface or the moving belt a V-belt, which is preferably glued to the contact surface or moving belt. Such a V-belt could run in a groove of the drive, thereby ensuring a reliable drive.

In a further advantageous manner, the roller assembly could comprise a plurality of preferably cascaded contact surfaces. This would permit realizing a particularly large contact surface.

In a further arrangement, the test stand could comprise a brake, which would permit decelerating the roller assembly. In this connection, one could use an eddy-current brake, which would permit realizing a configuration of the test stand as a performance test stand.

In an advantageous manner, the test stand of the invention could be used as a road simulator, which would permit realizing a great variety of road configurations.

In practice, it has been found that the motor vehicle to be tested, and in this instance in particular the front wheels will not remain arranged or positioned in a stable manner on the roller assembly or the contact surface, when a test or measurement is performed. More specifically, the motor vehicle is able to slip off at times from the test stand or the roller assembly. In this respect, the roller assembly could include a device for adjusting a negative track, thereby quasi permitting a centering or predeterminable positioning of the motor vehicle on the roller assembly or the contact surface. The use of this device achieves a high degree of positioning stability with respect to the vehicle on the test stand or roller assembly.

The test stand of the invention can be used in particular for testing the axle alignment. Furthermore, it is possible to measure the resultant static and dynamic weight by the vertically movable mount for determining the weight increase or weight decrease at rest and during the rotation of the wheel.

Last but not least, the invention also comprises the arrangement of additional systems below the roller assembly, which permit causing the roller assembly as a whole to vibrate, and/or rotate, and/or pivot vertically. Last but not least, the contact surface is supported such that it is possible to measure via corresponding measuring devices the forces or the displacement along each axis of movement.

The rollers or cylinders could drift sideways, or the entire frame could drift sideways, thereby making it possible to determine the track or a camber.

The test stand of the invention permits testing a large number of operational elements around the chassis and the drive of an motor vehicle. These include, for example, the engine, transmission, wheel suspension, wheels, tires, brake, shock absorbers, track, joints, steering, and many more. Also convincing are the many universal installation possibilities of the test stand, both on and in the floor, in lifting platforms, and even on vehicles. The special concept of the test stands permits individual tests of functions, as are known from testing devices of the art. Moreover, it is possible to activate all tests essentially at the same time, so that a universal testing possibility exists, which has until now been unknown.

For example, the test stand permits measuring the rolling resistance without external influence by, for example, bearings or gear friction in the drive and brake sections.

To simulate driving in a curve, as well as for special measuring programs, it is possible to place the entire test stand on a turning mechanism, which can be guided into any desired angular position relative to the direction of travel.

The test stand of the invention can be easily retrofitted into all existing pits of a workshop. As a result, it is possible to realize a test line with, for example, track testing, brake testing, and shock absorber testing. It is possible to perform in a simple manner an axle alignment and weight measurements.

There exist various possibilities of improving and further developing the teaching of the present invention in an advantageous manner. To this end, one may refer to the following description of embodiments of the invention with reference to the drawing. In conjunction with the description of the preferred embodiments of the invention with reference to the drawing, also generally preferred improvements and further developments of the teaching are described.

DETAILED DESCRIPTION OF THE PREFERRED EMBODIMENTS

Figure 1:
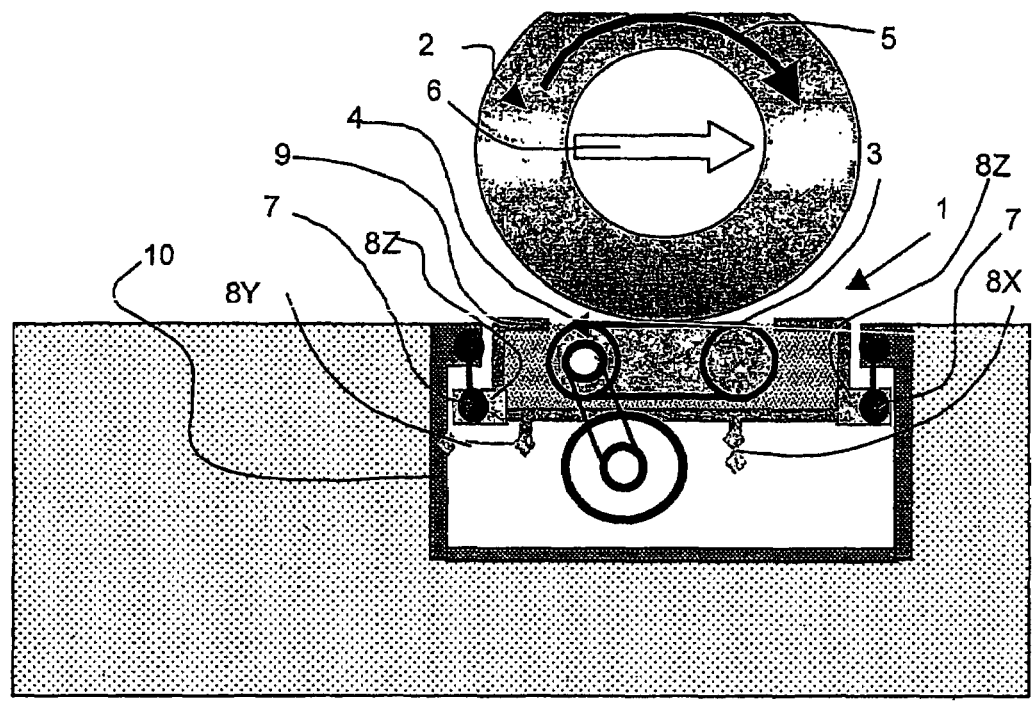
FIG. 1 is a schematic side view of a test stand according to the invention with a wheel being in a testing position.

FIG. 1 is a schematic side view of a test stand for motor vehicles, which comprises as an essential component a roller assembly 1 for rolling wheels 2. The roller assembly 1 forms a contact surface 3 for the wheel 2. The contact surface 3 is driven for rotation, and preferably adapted to be blocked, and/or braked, and/or released. The preferred direction of rotation of the roller assembly 1 and, more specifically, that of its contact surface 3 is indicated by an arrow 4. The preferred direction of rotation of the wheel 2 is indicated by an arrow 5. An arrow 6 indicates the direction of travel of the motor vehicle, with the travel of the motor vehicle being simulated by the rotation of the roller assembly 1.

With respect to a particularly indicative and comprehensive testing of functions, the roller assembly 1 is mounted for at least a slight movement with at least two degrees of freedom. To determine the force generated by the motor vehicle during its driving and braking movements, it is possible to measure the force that is operative in these instances between the roller assembly 1 and a predeterminable fixed point 10, and/or the displacement that occurs during the driving and/or braking movements of the motor vehicle, and/or the angle of rotation between the roller assembly 1 and the predeterminable fixed point 10. In the present embodiment, the fixed point 10 is formed by a mounting frame or stand.

At this point, it should be remarked that it is intended to test always the two wheels 2 of an axle at the same time. Consequently, the practical operation requires in most cases two test stands and, more specifically two roller assemblies 1 for simultaneously testing both wheels 2.

The roller assembly 1 is suspended for free movement by means of a bearing 7 relative to the mounting frame or fixed point 10, along all axes in all directions, and is preferably guided by means of an XYZ-carriage.

To measure the occurring forces and/or distances, force measuring devices and/or measured value transducers 8 are provided, with 8X representing a measurement transverse of the direction of travel, 8Y a measurement in the direction of travel 6, and 8Z a measurement in the vertical direction, for example, for measuring the weight.

The roller assembly 1 is arranged in a frame 9, which is coupled with the roller assembly 1. The entire frame 9 is mounted for movement relative to the fixed point 10.

The frame 9 of FIG. 1 is inserted into a recess in the floor, which accommodates the mounting frame 10. Basically, it would be also possible that the force measuring device and/or distance measuring device 8 is operative within the frame 9 between rollers 12, 15 provided therein and the frame 9.

Figure 2:
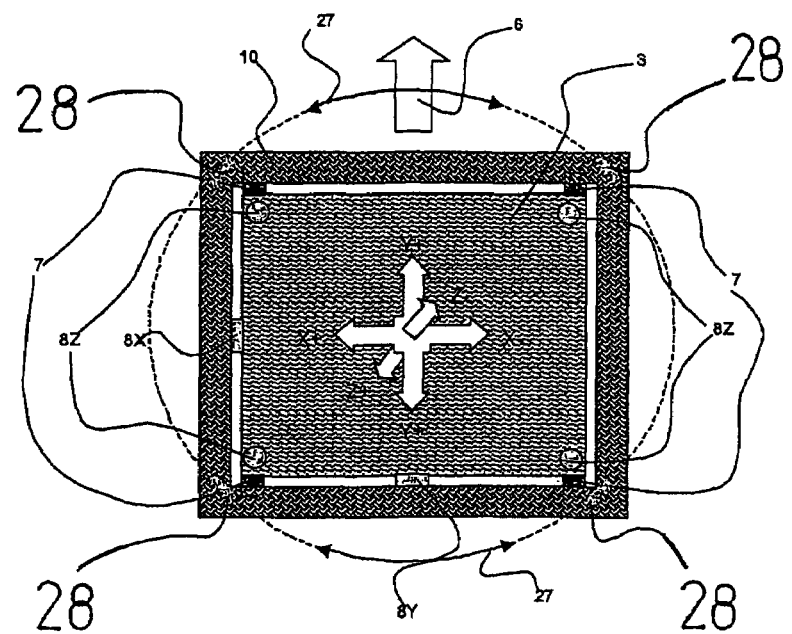
FIG. 2 is a schematic plan view of the possible degrees of freedom of the test stand with an exemplary arrangement of force transducers and sensors.

FIG. 2 is a schematic plan view of the test stand of FIG. 1 with its degrees of freedom indicated by arrows. The rotation about the Z-axis in a direction of rotation 27 is likewise indicated by arrows. A corresponding bearing 28 enables the rotation.

Figure 3:
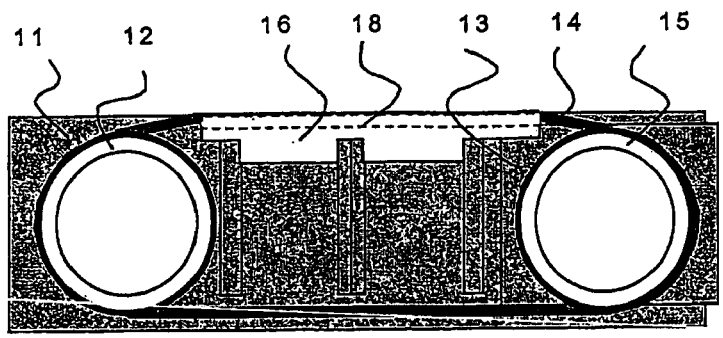
FIG. 3 is a schematic detail view of the roller assembly of the test stand with a slide plate insert.

FIG. 3 is a schematic side view of the roller assembly 1 with a sliding device 16 that is operative below the contact surface 3. The sliding device 16 is constructed as a slide plate. The contact surface 3 is formed by a moving belt 14 that extends over the sliding device 16. A roller 12 serves as drive roll, which is driven by a rotational drive or motor 21. In addition, the roller assembly 1 is arranged in a special mounting frame 11, which is coupled with the frame 9, if need be. The roller 15 is constructed as a freely rotatable deflection roll. The moving belt 14 is pretensioned via a tensioning device 13 by displacing the deflection roll 15 such that it frictionally engages the drive roll 12. In the sliding device or the slide plate 16, grooves 18 are provided for absorbing lateral forces.

Figure 4:
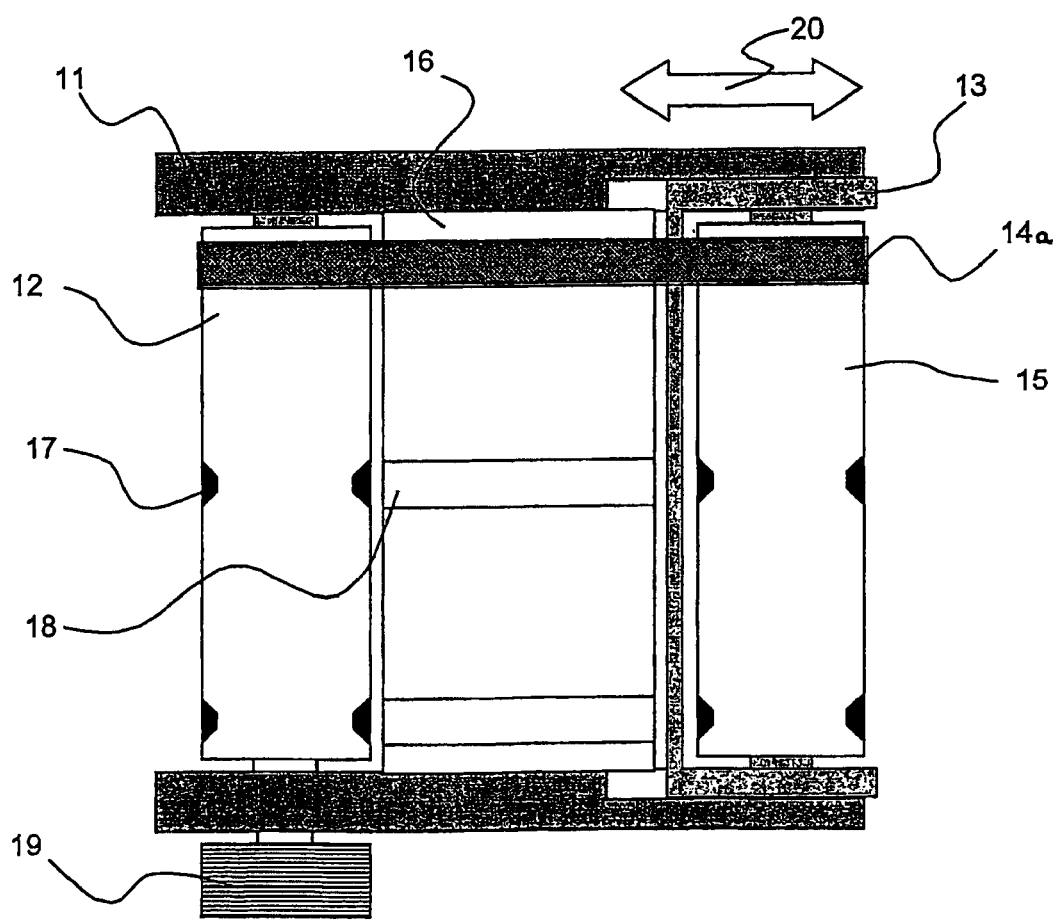
FIG. 4 is a schematic plan view of the roller assembly of FIG. 3.

The grooves 18 are best seen in FIG. 4, which is a schematic plan view of the roller assembly 1. The roller 12 is coupled with a belt pulley 19 which connects to a drive motor 21. The moving belt 14 comprises belts 14*a* that form guide elements, and which extend in the groove 18 as well as in grooves 17 that are provided in the rollers 12 and 15. With that, lateral forces are reliably absorbed during the rotation of the moving belt 14. For the sake of simplicity, the moving belt 14 is not shown in FIG. 4.

Figure 5:
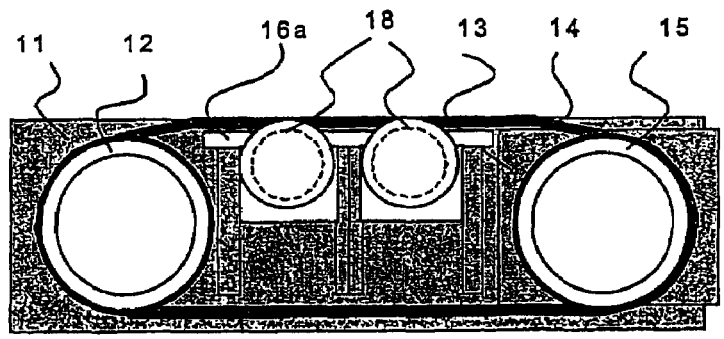
FIG. 5 is a schematic side view of the roller assembly with a roller insert.
Figure 6:
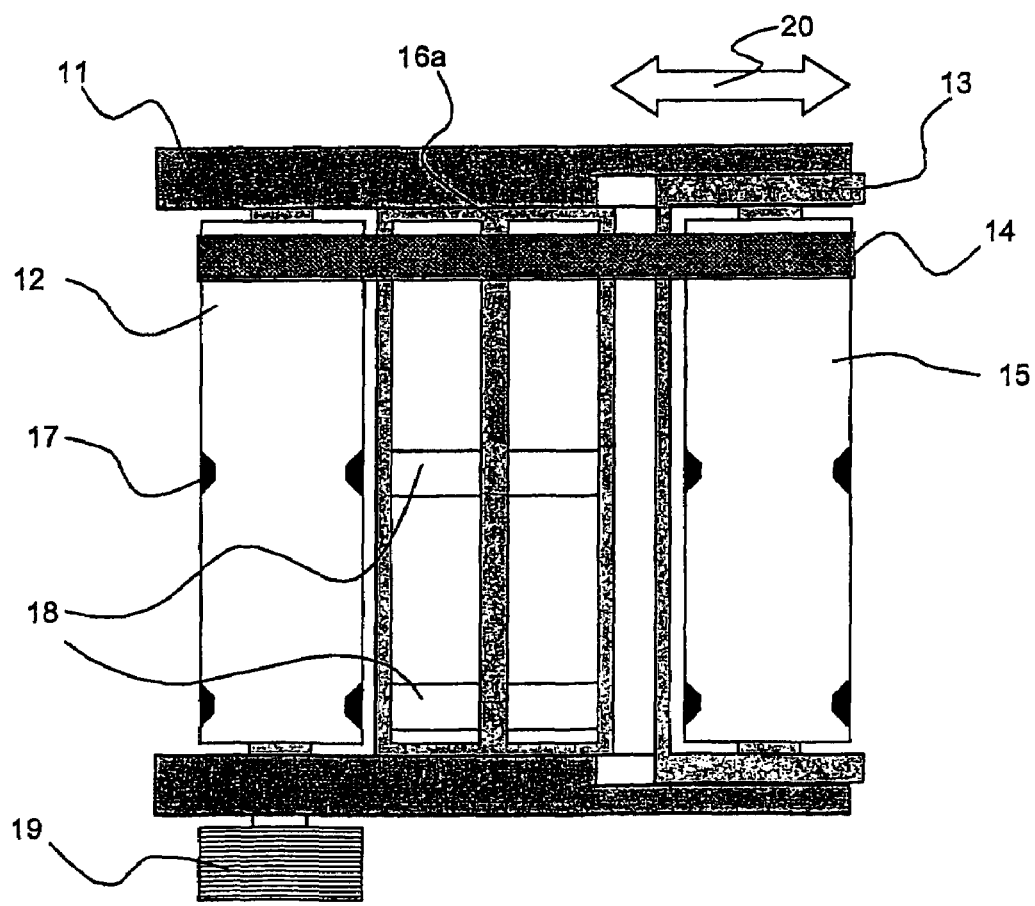
FIG. 6 is a schematic plan view of the roller assembly of FIG. 5.

FIGS. 5 and 6 illustrate a further embodiment of a roller assembly 1, wherein a roller or cylinder arrangement 16*a* is provided in the place of a sliding device 16. Otherwise, the FIGS. 5 and 6 correspond to FIGS. 3 and 4. To illustrate the movability of the roller assembly 1, FIGS. 4 and 6 show the movability in the direction of travel 6 by a double arrow 20. The roller assembly 1 may selectively comprise a sliding device 16 or a roller or cylinder arrangement 16*a*.

Figure 7:
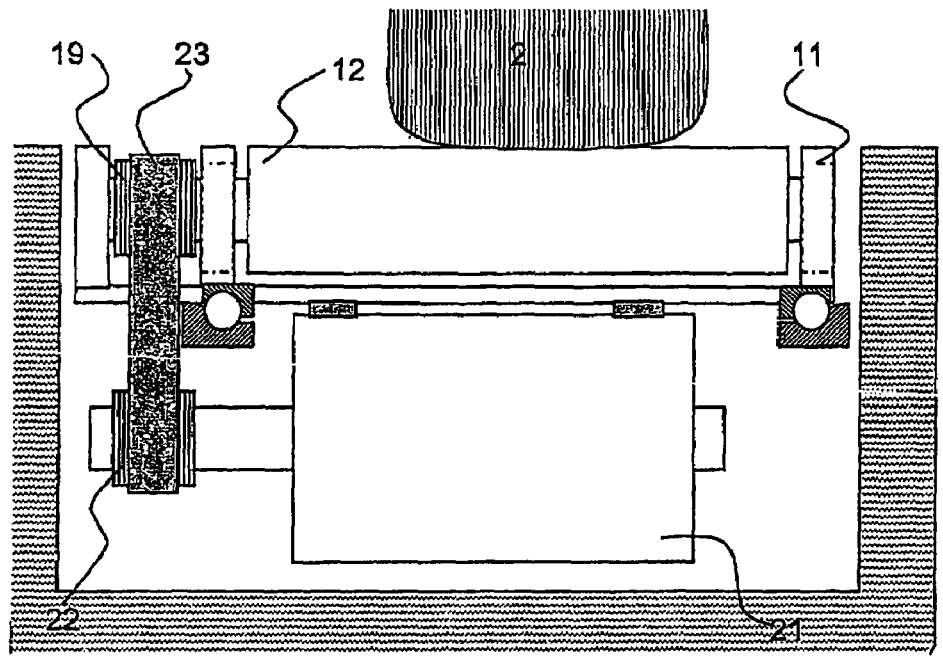
FIG. 7 is a schematic front view of the test stand of FIG. 1 installed in the floor.

FIG. 7 is a schematic front view of a test stand installed in the floor. In this embodiment, the motor 21 is arranged below the roller assembly 1. The motor 21 is coupled with the roller assembly 1 via a belt pulley 22 and a belt 23 as well as the belt pulley 19. The frame 11 of the contact surface 3 corresponds to the frame 9 of the entire roller assembly 1.

Figure 8:
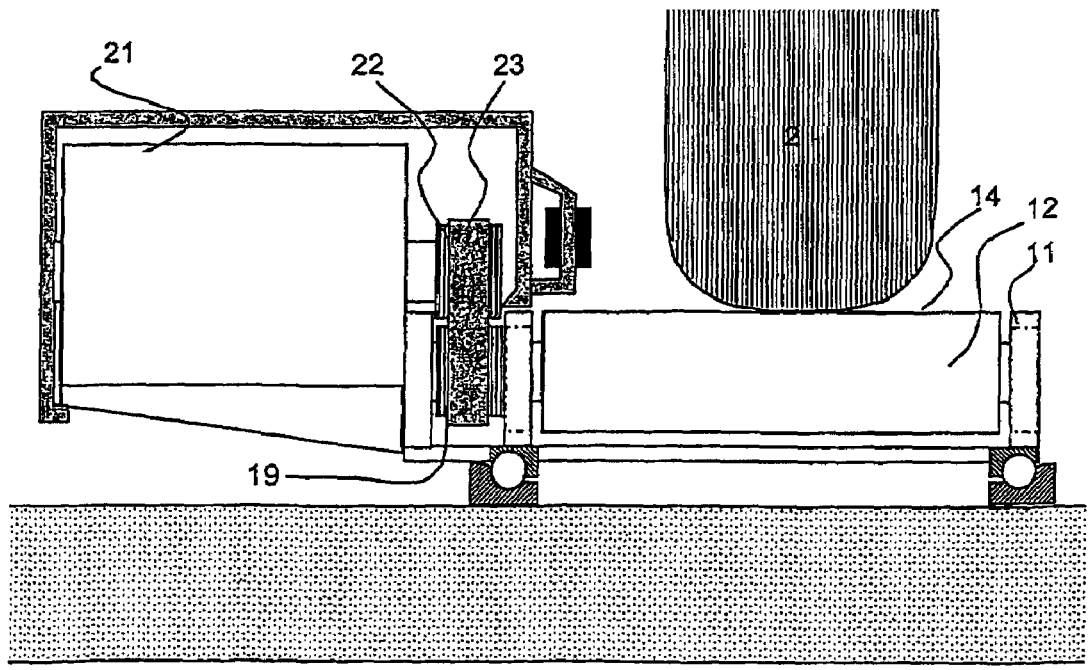
FIG. 8 is a schematic front view of a further embodiment of the test stand according to the invention, which is installed on the floor.

FIG. 8 is a schematic front view of a test stand installed on the floor. In this embodiment, the motor 21 is arranged on the side of the roller assembly 1. As shown both in FIG. 7 and in FIG. 8, the motor 21 is always associated to the roller assembly 1, and thus moves together with the roller assembly 1 toward the selected fixed point 10, when measurements are performed.

Figure 9:
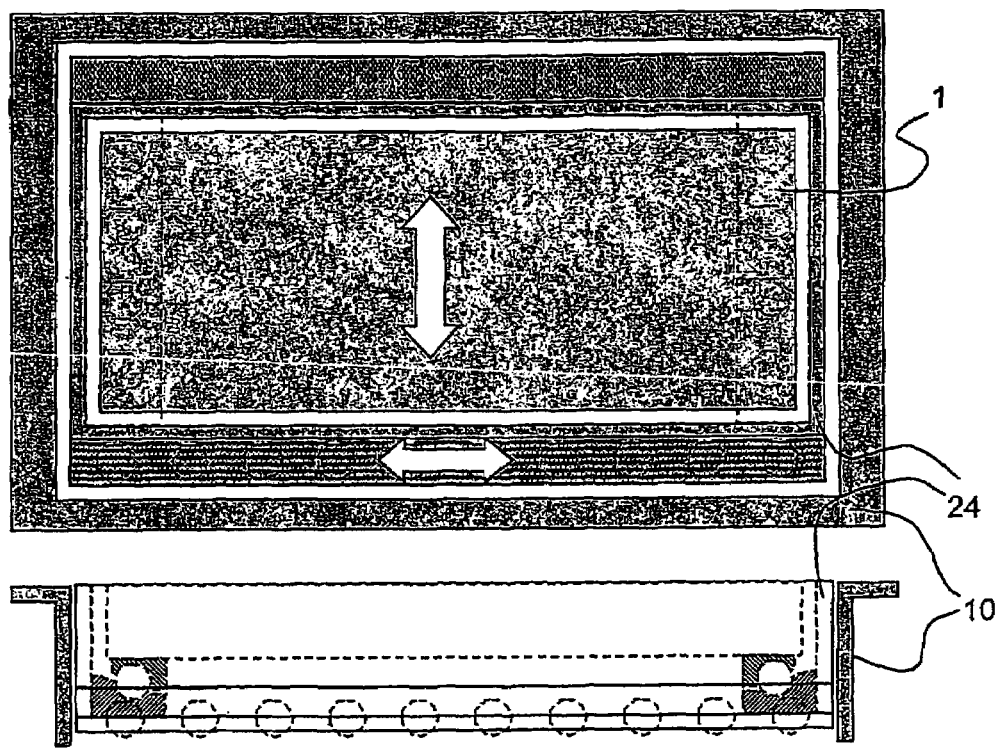
FIG. 9 is a schematic plan and front view of the roller assembly in a configuration as an XY carriage with ball bearings.

FIG. 9 shows the roller assembly 1 in a realization with an XY-carriage mount. FIG. 9 illustrates both a plan view and a front view of the roller assembly 1, which is supported with its frame 9 in a mounting frame and relative to a fixed point 10. At numeral 24 an XYZ-frame is shown with ball-bearing mount and weighing cells. This frame 24 is adapted for movement relative to the fixed point 10. As a result, the roller assembly 1 is freely movable in all directions.

Figure 10:
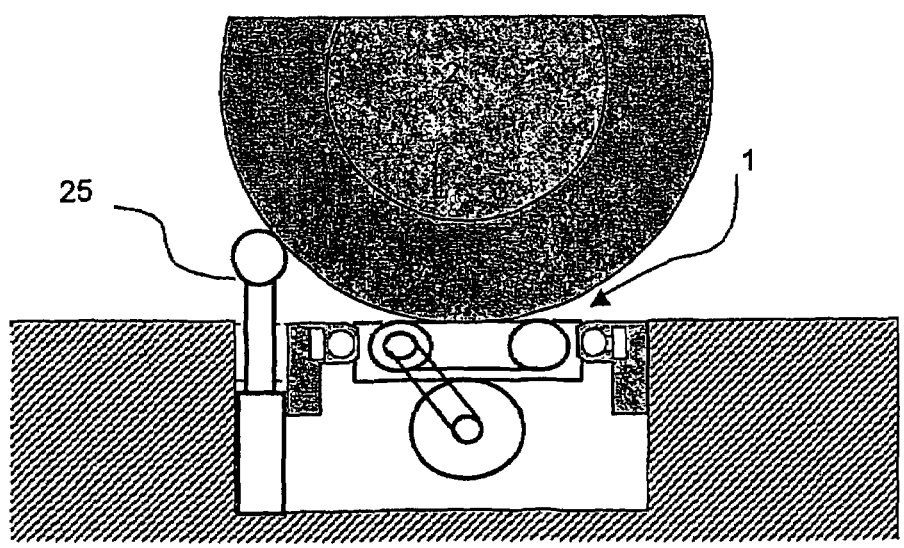
FIG. 10 is a schematic side view of the roller assembly with a raised support roller.

FIG. 10 is a schematic side view of the roller assembly 1 with an extended support roller 25, which props the wheel 2.

As regards further advantageous embodiments of the test stand according to the invention, the general part of the specification as well as the attached claims are herewith incorporated by reference for purposes of avoiding repetitions.

Finally, it should be expressly pointed out that the above-described embodiments serve to explain merely the claimed teaching without, however, limiting it to the embodiments.

The invention claimed is:

1. A test stand for motor vehicles comprising
   a mounting frame,
   a roller assembly mounted to the mounting frame so as to permit at least slight movement in each of at least two degrees of freedom relative to the mounting frame, with said roller assembly comprising at least two parallel rollers with an endless belt extending about the peripheries of the rollers so as to form a rotatable contact surface positioned to support a rolling wheel of a motor vehicle thereupon, and wherein the at least two degrees of freedom include a first degree of movement corresponding to a horizontal direction of travel along which the vehicle is adapted to move and a second degree of movement corresponding to a horizontal direction which is transverse to the direction of travel, and a drive for rotating the rollers and the endless belt,
   sensor means for measuring the force or displacement between the roller assembly and the mounting frame in each of the two degrees of freedom, and
   wherein the roller assembly is mounted to the mounting frame to permit at least slight movement relative to the mounting frame about a further degree of movement corresponding to a vertical direction, and wherein the sensor means is configured for measuring the force or displacement between the roller assembly and the mounting frame in the vertical direction.

2. The test stand of claim 1, wherein the drive is configured to permit it to be blocked, and/or braked, and/or released.

3. The test stand of claim 1, wherein the roller assembly comprises three or more parallel rollers.

4. The test stand of claim 1, wherein the mounting frame is mounted within a floor opening so that the rollers or cylinders extend above the level of the floor.

5. The test stand of claim 1, wherein the test stand is in the form of an independent functional module.

6. The test stand of claim 1, wherein the drive comprises an electric motor which is operatively connected to one of the rollers.

7. The test stand of claim 1, wherein the roller assembly further comprises a tensioning device for tensioning the endless belt.

8. The test stand of claim 1, wherein the roller assembly further comprises a slide plate, or an arrangement of rollers, mounted to the mounting frame so as to underlie and support the upper surface of the endless belt.

9. The test stand of claim 8, wherein the at least two parallel rollers, and/or the slide plate or the arrangement of rollers, includes a guide means for absorbing lateral forces imparted to the endless belt during operation of the test stand.

10. The test stand of claim 1 further comprising a freely rotatable support roller mounted to the mounting frame so as to be positioned behind and/or in front of the wheel of the vehicle being tested and so as to engage the wheel during testing thereof.

11. The test stand of claim 10 wherein each support roller is mounted for movement between a raised operative position and a lowered position which permits the wheel of the vehicle being tested to travel over the support roller.

12. The test stand of claim 1, wherein the two parallel rollers are mounted to the mounting frame so that the axes thereof are parallel to the transverse direction.

13. The test stand of claim 12, wherein the roller assembly is mounted to the mounting frame to permit at least slight movement relative to the mounting frame about another degree of movement corresponding to the angle of rotation about a vertical axis, and wherein the sensor means is configured for measuring the angle of rotation about said axis.

14. The test stand of claim 12, wherein the at least two parallel rollers include aligned grooves which receive guide elements which form a part of the endless belt, so as to absorb lateral forces imparted to the belt during operation of the test strand.

15. A test stand for motor vehicles comprising
a mounting frame,
a roller assembly mounted to the mounting frame so as to permit at least slight movement in each of at least two degrees of freedom relative to the mounting frame, with said roller assembly comprising at least two parallel rollers with an endless belt extending about the peripheries of the rollers so as to form a rotatable contact surface positioned to support a rolling wheel of a motor vehicle thereupon, and wherein the at least two degrees of freedom include a first degree of movement corresponding to a horizontal direction of travel along which the vehicle is adapted to move and a second degree of movement corresponding to a horizontal direction which is transverse to the direction of travel, and a drive for rotating the rollers and the endless belt,
sensor means for measuring the force or displacement between the roller assembly and the mounting frame in each of the two degrees of freedom,
wherein the two parallel rollers are mounted to the mounting frame so that the axes thereof are parallel to the transverse direction, and wherein the at least two parallel rollers include aligned grooves which receive guide elements which form a part of the endless belt, so as to absorb lateral forces imparted to the belt during operation of the test strand.

16. The test stand of claim 15, wherein the roller assembly is mounted to the mounting frame to permit at least slight movement relative to the mounting frame about a further degree of movement corresponding to a vertical direction, and wherein the sensor means is configured for measuring the force or displacement between the roller assembly and the mounting frame in the vertical direction.

17. The test stand of claim 16 wherein the roller assembly is mounted to the mounting frame to permit at least slight movement relative to the mounting frame about another degree of movement corresponding to the angle of rotation about a vertical axis, and wherein the sensor means is configured for measuring the angle of rotation about said axis.

* * * * *